No. 809,130. PATENTED JAN. 2, 1906.
C. PFEIFFER.
EQUALIZING WINDER FOR SPRING MOTORS.
APPLICATION FILED NOV. 18, 1903.
5 SHEETS—SHEET 1.
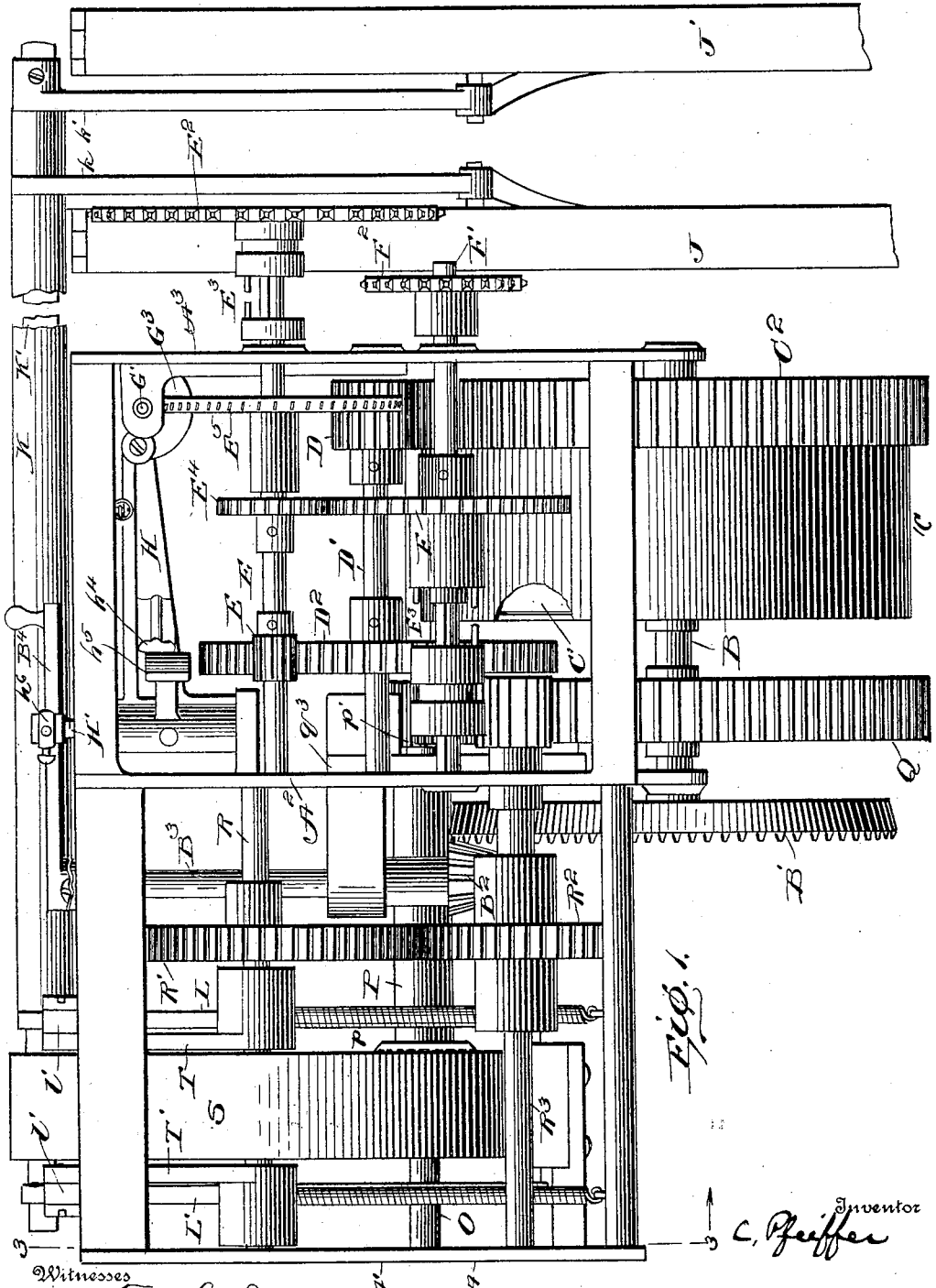

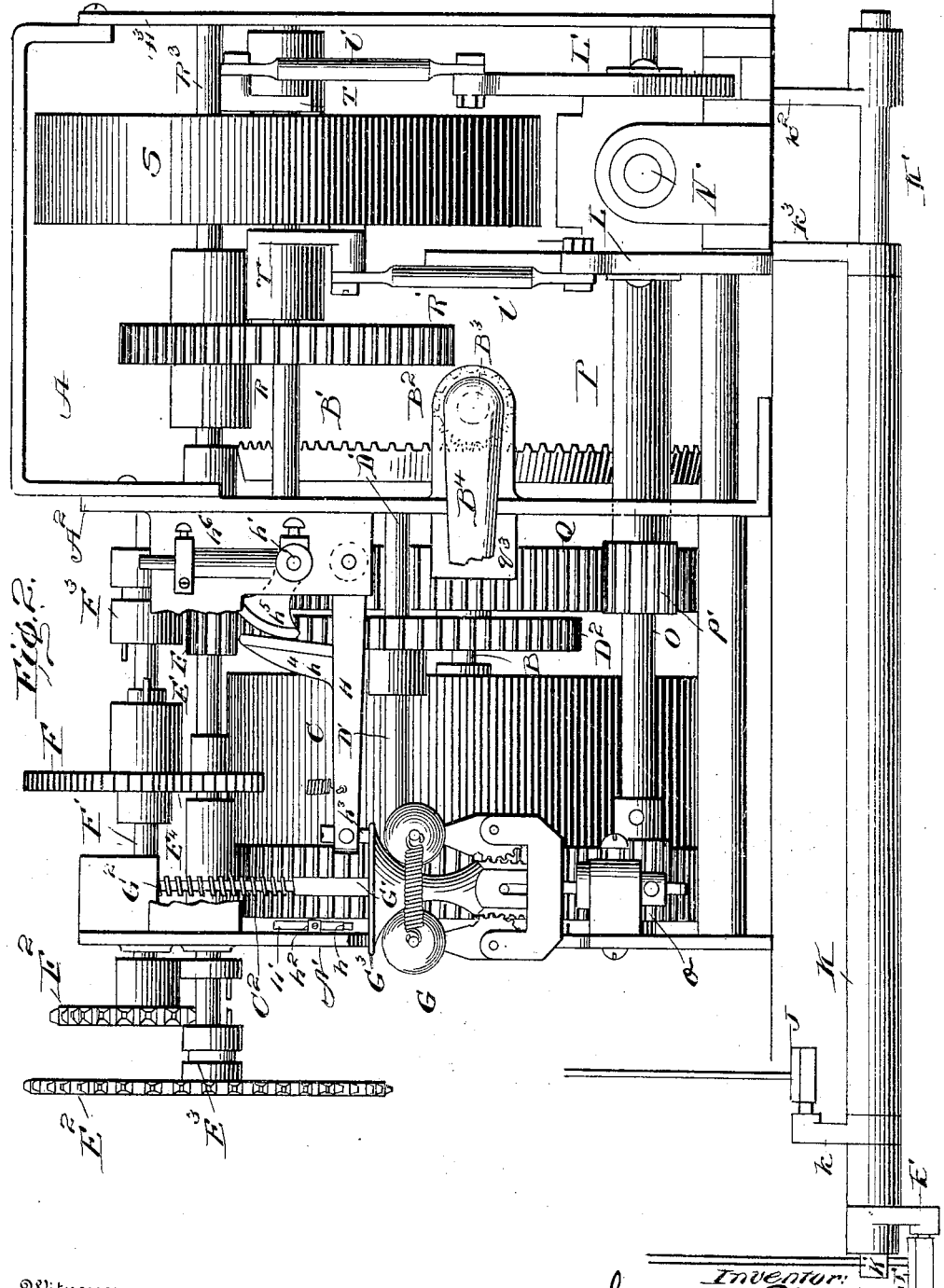

No. 809,130.
PATENTED JAN. 2, 1906.
C. PFEIFFER.
EQUALIZING WINDER FOR SPRING MOTORS.
APPLICATION FILED NOV. 18, 1903.
5 SHEETS—SHEET 3.
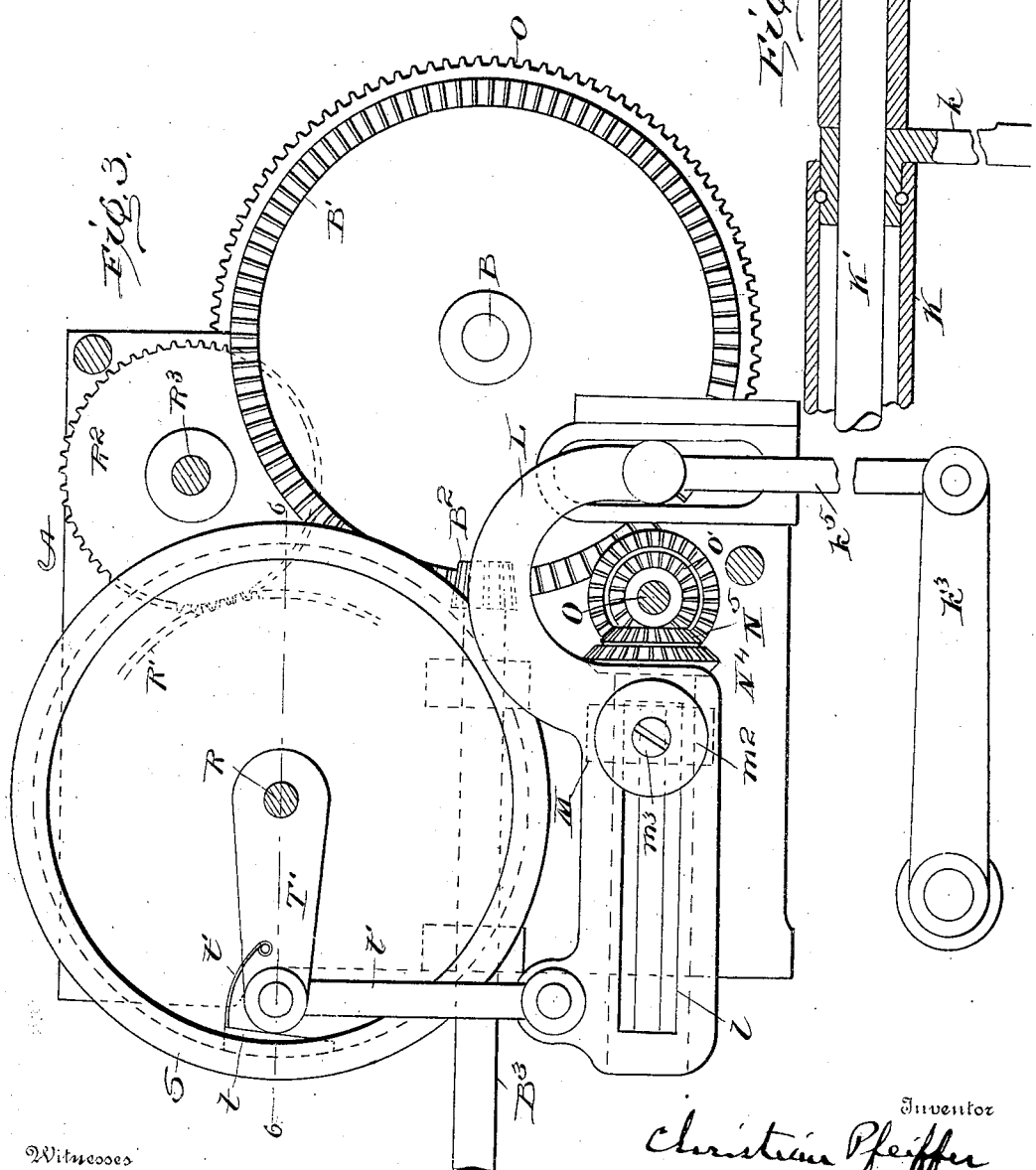

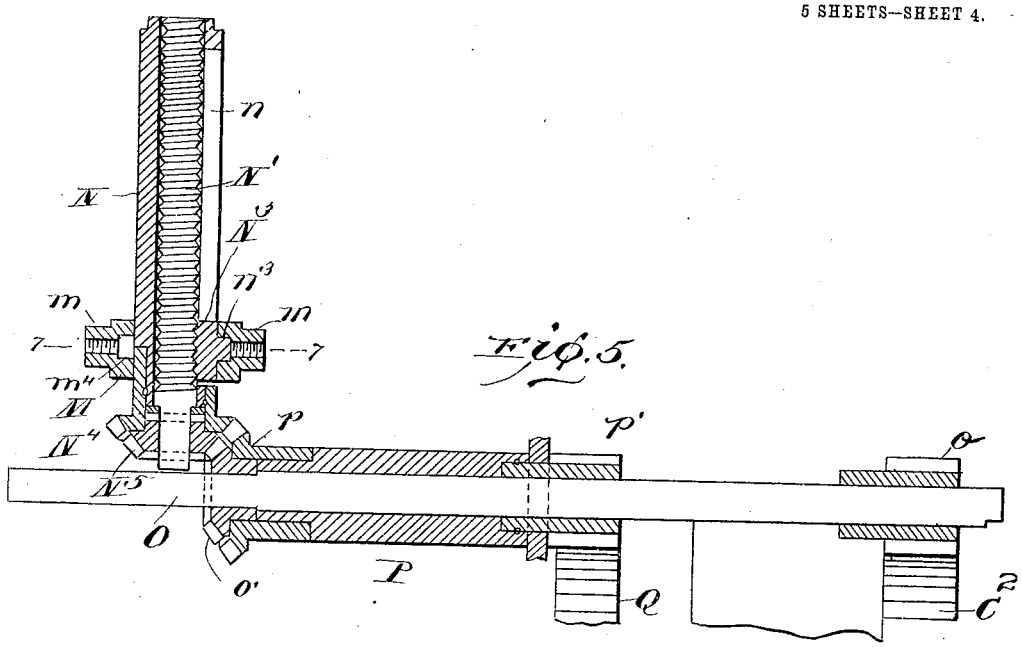
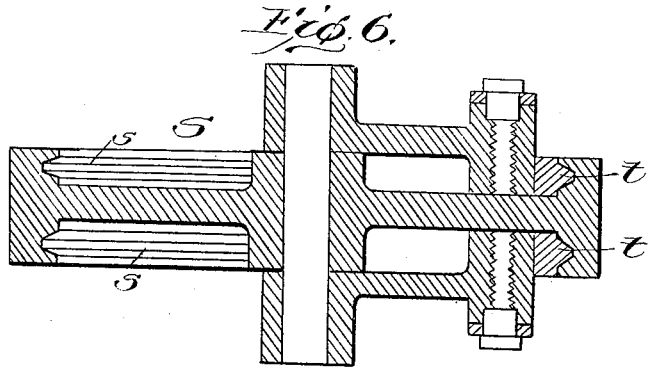
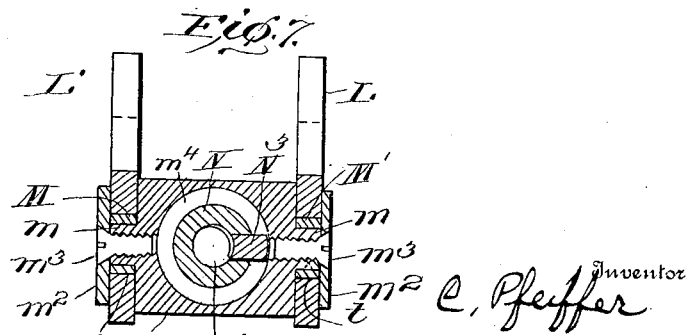

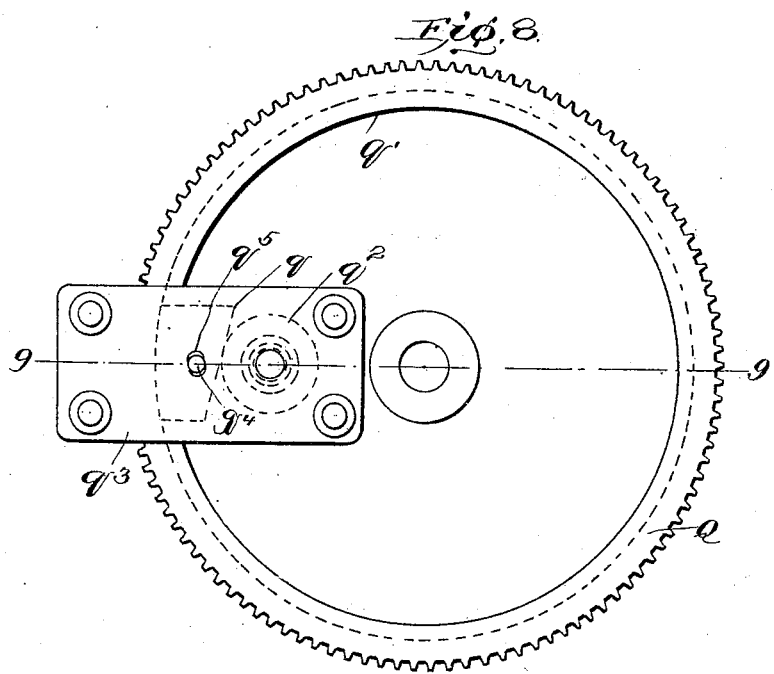
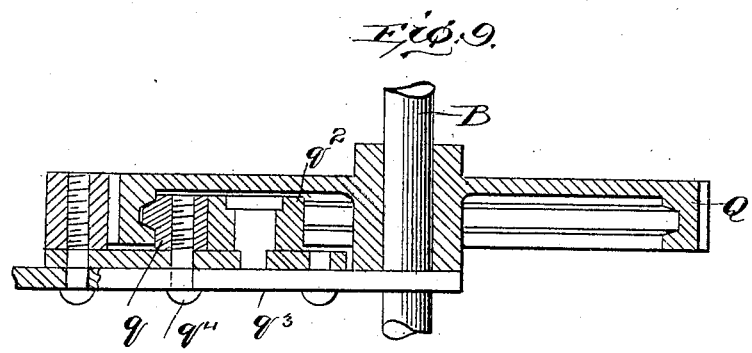
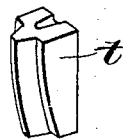

UNITED STATES PATENT OFFICE.

CHRISTIAN PFEIFFER, OF NEW BRITAIN, CONNECTICUT, ASSIGNOR TO THE NEW BRITAIN HARDWARE MANUFACTURING COMPANY, OF NEW BRITAIN, CONNECTICUT, A CORPORATION OF CONNECTICUT.

EQUALIZING WINDER FOR SPRING-MOTORS.

No. 809,130.      Specification of Letters Patent.      Patented Jan. 2, 1906.

Application filed November 18, 1903. Serial No. 181,701.

*To all whom it may concern:*

Be it known that I, CHRISTIAN PFEIFFER, a citizen of the United States, residing at New Britain, in the county of Hartford, State of Connecticut, have invented certain new and useful Improvements in Equalizing Winders for Spring-Motors, of which the following is a description, reference being had to the accompanying drawings and to the letters of reference marked thereon.

My invention relates to that class of motors actuated by a spring or weight to wind and rewind the music-sheet of an automatic or self-playing instrument.

The objects of my invention are to provide such a motor with means for rewinding it while running, to provide means for operating this rewinding mechanism from the pedals which operate the bellows, to provide means for preventing overwinding of the motor and to control the winding and unwinding, so that the winding of the motor may be made to equal the unwinding and maintain a constant tension or the winding may be made to exceed the unwinding and the accumulated energy be used to run the motor for a while without further winding, this stored energy being used in a piano-player to reroll the music-sheet when the pedals are not in use; also, to provide a lever mechanism for so winding the motor, such mechanism having a shifting fulcrum, whereby the leverage is maintained in direct proportion to the winding of the motor. These objects I accomplish by the construction shown in the accompanying drawings, in which—

Figure 1 is a top plan view of a motor having my improvements applied. Fig. 2 is a rear elevation of the same. Fig. 3 is a sectional end elevation on line 3 3, Fig. 1. Fig. 4 is a detail sectional view of the pedal-actuated rock-shafts. Fig. 5 is a sectional plan view of the controlling mechanism. Fig. 6 is a horizontal section on line 6 6, Fig. 3. Fig. 7 is a section on line 7 7, Fig. 5. Fig. 8 is a side elevation of the auxiliary winding-wheel and its stop-clutch. Fig. 9 is a section on line 9 9, Fig. 8. Fig. 10 is a perspective of one of the clutch-blocks of the driving pulley or wheel of the intermittent grip mechanism.

A designates the casing, formed of three parallel plates $A'$ $A^2$ $A^3$, connected by suitable cross-bars.

B designates the winding-shaft of the motor, on which is mounted a bevel-gear $B'$, engaged by a smaller bevel-gear $B^2$ on the end of a shaft $B^3$, mounted at right angles to shaft B and provided with a handle $B^4$ or equivalent device by means of which it may be rotated by hand to accomplish the initial winding of the motor through the shaft B.

The motor preferably comprises a spring-actuated drum C, loose on shaft B and connected thereto by the spring $C'$ in the manner common to spring-motors. The power of the spring is transmitted from the drum C by means of a large gear-wheel $C^2$, which in turn meshes with a small gear D on a shaft $D'$, parallel with shaft B and in rear thereof. The shaft $D'$ is provided with a larger gear $D^2$, which in turn meshes with a small gear E on the upper rear shaft $E'$, which is the transmission-shaft for operating the music-rerolling shaft of a piano-player or like device. This transmission-shaft $E'$ is provided with a loose transmission sprocket-wheel $E^2$, adapted to be clutched thereto by a suitable clutch $E^3$, and is also provided with a gear $E^4$, meshing with a larger loose gear F on a second transmitting shaft $F'$, provided with a sprocket $F^2$ for operating the take-up or winding roll of a music-sheet. (Not shown.) This loose gear F may be clutched to its shaft by any suitable clutch $F^3$.

The motor-spring is governed by means of a centrifugal governor G, having a vertical shaft $G'$, provided with a worm $G^2$, meshing with a worm-wheel $E^5$ on transmission-shaft $E'$. The friction-plate $G^3$ of the governor rises and falls in the usual manner on shaft $G'$ and is adapted to engage a fixed friction-block $h$, carried in an adjustable holder $h'$, mounted in a bearing $h^2$. The plate $G^3$ may also be engaged by a brake-shoe $h^3$ on the free end of a brake-arm H, having a cam projection $h^4$ on its upper side engaged by a cam projection $h^5$ on a rock-shaft $H'$, the latter having an operating-arm $h^6$. The fixed friction block or shoe $h$ and plate $G^3$ serve to limit the speed, and the brake-arm H and its shoe $h^4$ serve as a means to regulate the speed at any time by the operator.

The operation of the above parts, briefly stated, is as follows: The spring-motor is first wound up by the hand-shaft and in unwinding will rotate the shaft E' and shaft F' when its operating-gear F is clutched thereto. The shaft E' will be rotated much faster than the shaft F' in order to reroll the music-sheet at a greater speed than it is unwound.

I will now describe the mechanism for rewinding the motor from the pedals of the bellows.

J J' are the pedals for the bellows and connected to the movable members thereof by suitable arms or cranks, (not shown,) and these pedals are raised after being depressed by suitable springs.

K K' are longitudinal rock-shafts, preferably concentric and lying one within the other. The outer tubular shaft K is provided with an operating-crank $k$, connected to the pedal J, while the inner shaft K' has a similar arm $k'$ connected to the pedal J', and the opposite ends of these shafts are provided with transmission-cranks $k^2$ $k^3$, respectively. These cranks $k^2$ $k^3$ are connected at their free ends to the free ends of vertically-rocking levers L L' by means of links $k^4$ $k^5$.

The levers L L' are provided with longitudinal slots $l$, into which project the fulcrum-studs $m$ $m$, secured to or formed on a traveling saddle or block M. The studs each have a slide-block M' to travel in the slots $l$ and are also provided at their outer ends with washers $m^2$ and screws $m^3$ for holding the slide-block in place.

The saddle M slides upon a tubular slotted shaft N, mounted in suitable bearings at the left side of the frame A, and within this tubular slotted shaft N is mounted a rotary equalizing-screw N', engaged by a nut $N^3$, extending from the saddle M through the slot $n$ in the shaft N. The saddle M has an internal annular groove $m^4$, in which works a lug $n^3$, projecting from the nut $N^3$. It follows from this construction that when the outer shaft N is rotated the nut $N^3$ will be carried around the screw-shaft N', and so slide the saddle M in one direction, and when the screw-shaft is rotated the nut $N^3$ will be moved longitudinally along the slot $n$, and so move the saddle M in the opposite direction. To accomplish this, the shaft N is provided at its forward end with a bevel-gear $N^4$, and the screw-shaft N' is provided at the same end with a smaller bevel-gear $N^5$.

O designates a shaft extending from side to side of the frame and provided at its right end with a small pinion $o$, meshing with the large transmitting-gear $C^2$ of the motor and provided at its opposite end with a bevel-gear $o'$, meshing with the bevel-gear $N^5$ of the screw-shaft N'.

P designates a tubular shaft surrounding the shaft O and provided at its left with a bevel-gear $p$, meshing with the gear $N^4$ of the shaft N. The shaft P is further provided with a small pinion $p'$, meshing with a large winding-gear Q, fast on the winding-shaft B of the motor. It follows, therefore, that the large gear-wheels Q $C^2$ will, through the gears $o$ $p'$, shafts O P, and gears $o'$ $p$, cause the reciprocation of the saddle M, as will be further described.

The winding-gear Q is auxiliary to the hand-operated gears B' $B^2$ and is operated as follows to wind the spring-motor: R is a drive-shaft provided with a gear-wheel R', meshing into the smaller gear $R^2$ on a driven shaft $R^3$, which in turn is provided with a small pinion $R^4$, meshing with the auxiliary winding-gear Q, which is the same size and has the same number of teeth as the gear $C^2$. This shaft R receives rotary motion from the levers L L' through the medium of an intermittent grip mechanism, preferably comprising a large pulley or wheel S, having annular beveled grooves $s$ in the inner face of its rim at opposite sides of its web engaged by beveled friction-blocks $t$, carried by springs $t'$, secured to rocking arms T T', mounted loosely on the shaft R and receiving rocking movement from the levers L L' to the rear ends of which they are pivotally connected by the links $l'$. The rocking clutch-arms T T' are provided at their free ends with rollers or other abutments to engage the outer inclined sides of the blocks $t$ and force them into clutching action with the drive pulley or wheel S in the upward movement of the arms. Reverse movement of the winding-gear Q and of the shaft B is prevented by means of a wedge-block $q$, similar to the blocks $t$ and held between the grooved rim $q'$ and a roller $q^2$, mounted on a stationary bracket $q^3$ by means of a pin $q^4$, projecting from the bracket and through a slot $q^5$ in the block, as shown in Figs. 8 and 9. In the forward rotation of wheel Q the block $q$ exerts no wedging action; but the instant the wheel is rotated in the opposite direction the block wedges tightly between the rim of the wheel and the roller, and so locks the wheel, and with it the winding-shaft B.

From the foregoing it will be seen that the winding and unwinding of the motor-spring are equalized, and so maintain a constant tension on the spring, or the winding may exceed the unwinding and the accumulated energy used to run the motor a part of the time without further winding. In a piano-player this stored energy is used to reroll the music-sheet when the pedals are not in use, and the motor does not have to be rewound by hand to effect such rerolling. The traveling saddle or controlling mechanism will prevent overwinding the spring and can be made to maintain any desired ratio between the winding and unwinding of the main-spring and between the speed of the motor and the movement of the pedals, as the leverage of the levers L L' is maintained in direct proportion to the winding of the spring through the shafts O P N N' and shifting saddle M. As soon as the spring is sufficiently wound the saddle M will have been shifted rearwardly till the fulcrum-studs $m\ m$ are in vertical alinement with the links $l'$, when the levers L L' will no longer transmit motion to the clutch-arms T T and wheel R. As the spring unwinds the opposite movements of the saddle M and lever-fulcrums take place.

The relative sizes of the gears and pinions and the pitch of the thread of screw N' are such that the number of revolutions necessary to wind the spring are just sufficient to move the nut and saddle from end to end of the lever-slots, so that if the spring is wound either by handle $B^4$ or by the pedals J J' when the saddle is at the rear end of the slot adjacent to the links $l'$, the fulcrum-studs of the rocking levers L L' being directly opposite the link connections, the vibratory movement of the levers ceases at the clutch end, but continues the same at the free forward ends, and so long as the parts are in this position the auxiliary winder is inoperative; but when the motor is started the transmitting-gear $C^2$ turns the pinion $o$, shaft O, pinion $o'$, pinion $N^5$, and screw-shaft N', the latter drawing the saddle forwardly along the levers L L', so that if the pedals are again operated the levers will again begin to move in proportion to the distance their fulcrums have moved.

If the movement of the pedals and winding-gears is slower than the transmitting-gear, the nut and saddle will continue to move forwardly, thus increasing the throw of the levers and amount of rotation of the wheel S and in like proportion the amount of winding of the motor-spring until the front ends of the lever-slots are reached, by which time the spring will be fully unwound and the motor stop until rewound. The motor may be entirely rewound from the pedals, if so desired. When the point is reached where the winding and transmitting gears revolve at the same speed, the motor can be run continuously by maintaining the same movement of the pedals, in which case the saddle will remain at a position where the movement of the pedals, and the winding will equal the transmitting, and if the work being done or the music being played require a variable speed the equalizer-saddle will adjust itself by increasing or decreasing the winding speed in the same proportion as the speed of the motor is changed, or if the movement of the pedals is not uniform, as in music where the volume of sound requires more or less power and motion of the pedals, the amount of winding remains constant in proportion to the motor speed, being kept equal by the automatic change of leverage. This equalizing of the winding and unwinding makes it unnecessary to have the spring fully wound, as the motor can be run with the spring at the least tension that is sufficient to do the work, as the automatic winding does not allow the spring to run down.

In a piano-player the music-sheet has to be rerolled after playing, so the controller is made to wind faster than the transmitting-gear unwinds, so as to have enough spring to reroll and leave the spring at normal playing tension at the end, the transmitting-gear being so arranged that the rerolling only requires one-fourth as much movement at the spring as the playing movement.

Having thus described my invention, what I claim, and desire to secure by Letters Patent, is—

1. The combination with a motor, of a winding mechanism, including a lever mechanism having an adjustable fulcrum, and means for shifting the fulcrum from the motor as it is being wound and unwound; substantially as described.

2. The combination with a motor having a transmitting-gear and a winding-gear, of a winding mechanism comprising a shaft geared to the winding-gear, a lever mechanism for rotating said shaft, a shifting fulcrum for the lever mechanism to vary the lever throw and extent of the winding, and operating connections between the said fulcrum and the transmitting and winding gears of the motor; substantially as described.

3. The combination with a motor having a transmitting-gear, and a winding-gear, of a lever mechanism operatively connected with the said winding-gear to wind the motor, a shifting fulcrum to vary the throw of the lever mechanism, gearing connecting the shifting fulcrum with the winding-gear of the motor and gearing connecting said shifting fulcrum with the transmitting-gear of the motor; substantially as described.

4. The combination with a motor having a transmitting-gear and a winding-gear, of a lever mechanism geared to the said winding-gear and including a shifting fulcrum-block, a tubular slotted shaft on which said shifting fulcrum reciprocates, a screw-shaft within the tubular shaft, a nut connecting the shifting fulcrum through said slot with the screw, gears on the ends of said tubular and screw shafts, and a second tubular and inner shaft geared respectively at one end with the first-named tubular and screw shafts, and at their other ends geared respectively to the said winding and transmitting gears of the motor; substantially as described.

5. The combination with a motor having a transmitting-gear and a winding-gear, of a shaft geared to the said winding-gear, for winding the motor, a lever mechanism for rotating said shaft, means for operating the lever mechanism, a shifting fulcrum for the lever mechanism to vary the throw thereof, and gearing connecting the said shifting fulcrum with the transmitting-gear and winding-gear of the motor, to shift the fulcrum back and forth as the motor is wound and unwound; substantially as described.

6. The combination with a motor having a transmitting-gear and a winding-gear, a shaft geared to the winding-gear and provided with a pulley or wheel, clutch-arms for rotating the wheel or pulley, slotted levers for rocking the clutch-arms, a fulcrum-saddle having an internal annular groove and provided with fulcrum trunnions or studs entering the lever-slots, mechanism for operating the levers, a longitudinally-slotted tubular shaft on which the said saddle slides, an inner screw-shaft, a nut extending through the shaft-slot into engagement with the screw-shaft, and having a lug projecting into the annular groove in the saddle and gearing connecting said tubular and screw shafts with the winding and transmitting gears of the motor; substantially as described.

7. The combination with a motor having a transmitting-gear, and a winding-gear, of a shaft geared to the said winding-gear and provided with a pulley or wheel, rocker-arms loose on the shaft, clutch devices at the rear ends of the arms to intermittently grip and release the wheel, longitudinally-slotted levers linked at their rear ends to the rear ends of said rocker-arms, a traveling fulcrum-forming saddle having trunnions entering the lever-slots, gearing for reciprocating the said saddle from the winding-gear and transmitting-gear of the motor, and rock-shafts connected to the slotted levers; substantially as described.

8. The combination with a motor having a winding-gear and a transmitting-gear, a transmitting-shaft meshing with the latter gear and provided with a loose transmitting-wheel and a clutch, a second oppositely-rotating transmitting-shaft loosely geared to the said transmitting-shaft and provided with a clutch and a transmitting-wheel, of a shaft geared to said winding-gear, an intermittent grip mechanism for rotating said shaft to wind the motor, and mechanism for controlling the throw of the intermittent grip mechanism from both the winding-gear and the transmitting-gear of the motor; substantially as described.

9. The combination with a motor having a transmitting-gear and a winding-gear, said winding-gear having an annular rim, a friction-clutch engaging the said rim, to prevent reverse rotation of the winding-gear, of a winding mechanism geared to said winding-gear, and a controlling mechanism for the extent of movement of the winding mechanism, and operatively connected to the said transmitting and winding gears of the motor; substantially as described.

10. The combination with a motor having a transmitting and a winding gear, the latter having an annular rim, a bracket mounted alongside said winding-gear and a wedge-like friction-block loose on the bracket and adapted to wedge against said rim and prevent reverse rotation of the winding-gear, of a winding mechanism geared to the said winding-gear, and a controller for controlling the extent of movement of the winding mechanism, and operative connections between the controller and the said transmitting and winding gears; substantially as described.

In testimony whereof I affix my signature in presence of two witnesses.

CHRISTIAN PFEIFFER.

Witnesses:
J. E. COOPER,
ANNA C. MALMFELDT.